Sept. 26, 1950     R. T. ERBAN     2,523,687
OPTICAL DEVICE FOR INVERTING IMAGES
Filed April 21, 1947
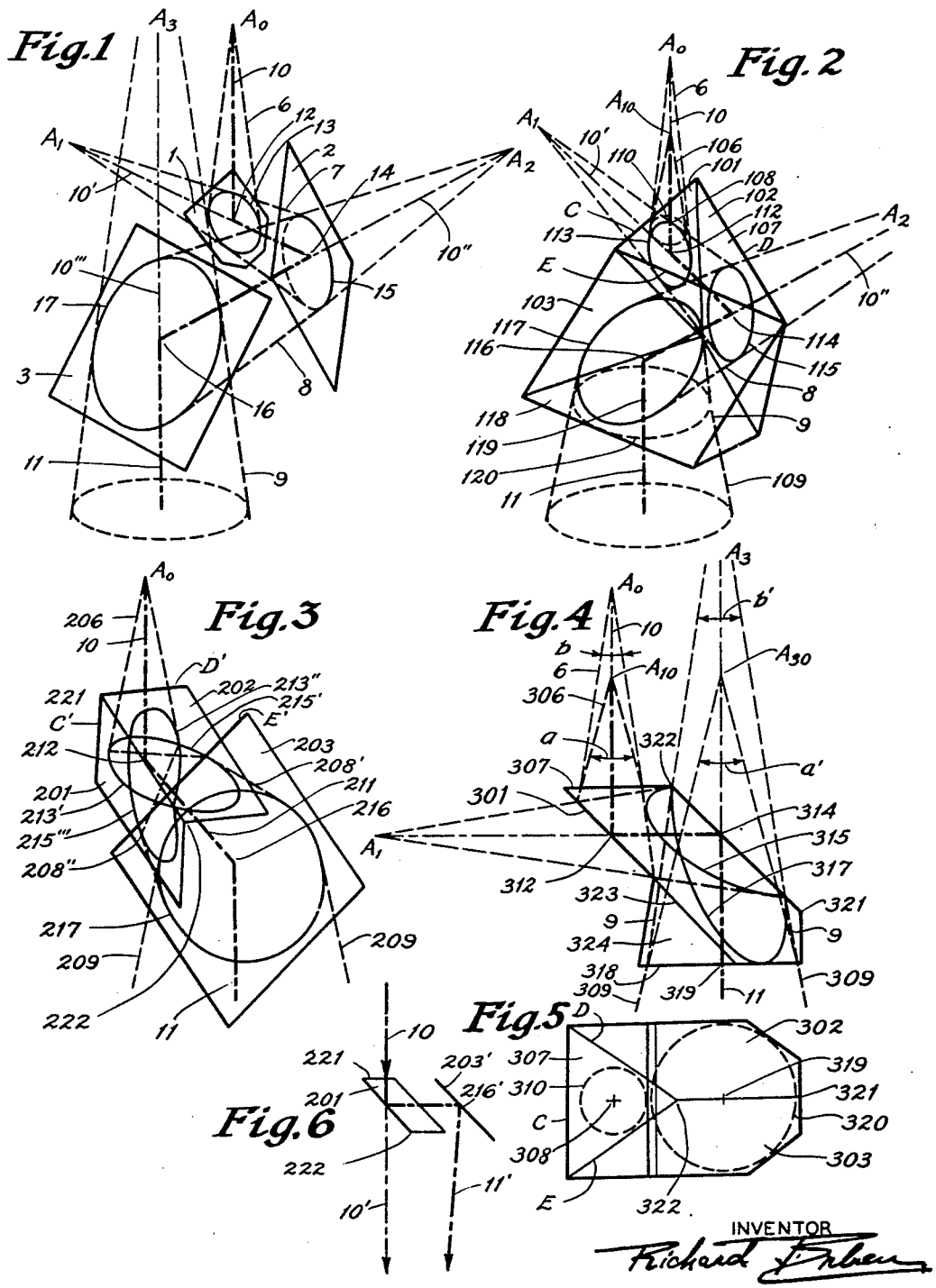
INVENTOR
Richard Erban Patented Sept. 26, 1950

2,523,687

UNITED STATES PATENT OFFICE 2,523,687

OPTICAL DEVICE FOR INVERTING IMAGES

Richard T. Erban, New York, N. Y.

Application April 21, 1947, Serial No. 742,839

3 Claims. (Cl. 88—1)

This invention relates to optical devices and more particularly to such a device for use in rotating an image in its own plane.

One of the objects of my invention is to provide such an optical device that will rotate a beam of light around its optical axis.

Devices which achieve this result are used in panoramic sights, periscopes and the like in order to keep the image in an upright position while the sight is turned in different directions. In this specification I use the term "optical inverter" as a general name for such devices, regardless of their structure. Their use with cameras or with projectors is very limited due to the shortcomings of known designs. The most frequently used optical inverter, the dove prism, is limited to a use with parallel rays, if serious aberrations are to be avoided. It is rather long for any but very small apertures and this leads to unwieldy dimensions if used in a beam of more than 10° to 15° divergence angle. By way of example, a dove prism for a cone of light of 28° apex angle and an entrance diameter of 5/8" requires a length of over 5 and ½ inches and, in addition, compensating means are required to correct the aberration introduced by the prism in the divergent beam. Cost, weight and bulk render the use of such prisms impractical. Several other structures which have been proposed do not materially improve these unfavorable conditions; and, their dimensions are usually larger than the dove prism whenever the optical qualities are better.

The optical inverter according to the present invention gives optically perfect images, that is, it introduces no aberration if used in a convergent or divergent beam. It is very compact and does not require unusual accuracy in its manufacture. It transmits light with a high efficiency and its different forms of embodiment can easily be adapted to the various requirements of the specific application.

It is among the main objects of my invention to provide an optical inverter for beams of light with apex angles of about 30°, which is of small size and can easily be manufactured at low cost. Such optical inverters are very useful in projection systems where it is desired to rotate the image on the screen without moving the film.

I obtain these objects, and others later to be pointed out, by a structure comprising at least three reflecting areas or surfaces inclined with respect to a plane square to the optical axis of the light beam entering the inverter or the light beam emanating from the inverter, and having the geometrical intersection lines of said surfaces or reflecting areas intersecting said plane at angles. The light beam after entering the inverter passes in succession from one reflecting surface or area to another. Said reflecting areas or surfaces are so positioned that the emanating beam from the optical inverter has substantially the same direction and is approximately parallel to the beam as it enters the said optical inverter.

My invention can be carried out in a variety of embodiments. In one form, the reflecting surfaces or areas are formed by optical mirrors surrounding a common air space; while in another, one reflecting surface or area is included in a prism and two other surfaces or areas are mirrors. In still another form, two reflecting areas or surfaces are combined in one prism while the third is a mirror. In a still further form all three reflecting surfaces or areas are formed by a prism, or a combination of prisms, whereby total reflection is used on at least some of the reflecting areas or surfaces.

Further objects of my invention and specific advantages of various forms will become apparent from a reading of the following specification taken in conjunction with the drawings which disclose some aspects thereof.

The accompanying drawing illustrates several forms of embodiment of my invention. They are given by way of examples only, and of necessity these illustrations can show only a few of the many ways in which an optical inverter can be built in accordance with my teachings, as herein disclosed, and as claimed.

In the drawings—

Fig. 1 shows a perspective view of a basic arrangement of three reflectors;

Fig. 2 is a perspective view of a prism embodying an optical strcture similar to that shown in Fig. 1;

Fig. 3 is a perspective view of another form of embodiment using three mirror surfaces;

Fig. 4 is an elevated view of a preferred form, consisting of a prism with three reflecting surfaces;

Fig. 5 is a bottom view of Fig. 4; and

Fig. 6 is a schematic illustration of an arrangement for compensation of lateral displacement.

The structure shown in all of the Figures 1 to 6 are adaptations of my invention for use with a divergent beam of light, such as the light beam of a projection system since this is one of the larger fields of application. It is, of course, understood that these structures serve equally well in a converging beam of light or in a beam of parallel rays. And although other optical inverters, such as the known devices above mentioned, can be used with parallel rays, the inverter according to my teachings gives the double advantage of entry and exit of a light beam at right angles to a prism surface and greatly reduced dimensions of prism as compared with others. Light absorption is also reduced and efficiency is much higher.

Referring now to the drawings for details of structure of the several illustrations—

In Fig. 1 the entering beam of light is shown as a cone 6 emanating from the apex $A_0$, and having an optical axis 10. Cone 6 impinges upon the first mirror 1, which is inclined with respect to the said optical axis 10. The optical axis 10 intersects the mirror surface in the point 12, the cone 6 intersects the mirror in the elliptical line 13, from where it is reflected. The reflected cone seems to emanate from the point $A_1$ which is the virtual image of the apex $A_0$ with respect to the mirror surface 1. The reflected optical axis 10' intersects the next mirror 2 in the point 14, while the reflected cone of light 7 impinges in the elliptical line 15 upon said mirror 2 which can be inclined with respect to the optical axis 10' or can be parallel to said axis 10'. Similar to what happened at the first mirror 1, the apex $A_0$ is again reflected in mirror 2 and gives the virtual apex $A_2$. This serves as a center from which the reflected beam seems to emanate after the second reflection. The optical axis 10'' (second reflection) impinges upon the third mirror 3 in the point 16 while the cone of light 8 impinges in the elliptical line 17. The said mirror or reflecting area is inclined with respect to the optical axis 10. Again a virtual image of $A_2$ is formed with respect to the mirror 3, giving apex $A_3$ which serves as virtual center of emanation for the exit beam 9. The optical axis 11 from $A_3$ is substantially parallel to the entrance axis 10 with a small lateral displacement thereto. Since the axis of the beam leaving the optical inverter is substantially parallel to the axis of the beam entering the inverter then all reflecting areas or surfaces inclined with respect to the axis 10 are also inclined with respect to the axis 11.

The structure described has, therefore, caused a divergent beam of light to continue substantially on its original course after having been reflected three times within a very small space element. The reflecting surfaces have been shown as mirrors of the first surface type, and they have been shown pulled apart from each other in order to avoid confusion in the drawing. In an actual optical inverter of this kind the reflecting areas or surfaces are positioned as close to each other as is consistent with the condition of avoiding interference with another part of the beam. For instance, the reflected beam 8 must not impinge upon mirror 1, and similarly beam 9 can have no interference with mirrors 1 and 2. All other conditions of spacing and angles being equal, such interference will increase with increasing apex angle and aperture. It is important to avoid such interferences as they create "ghost images." Interferences can usually be greatly reduced by cutting the mirrors close to the critical line (the elliptical intersection or impinging lines) at the critical areas, or by slight changes in the relative angles of the reflectors. Those skilled in the art can easily determine the best relative positions and dimensions by ray tracing through the system.

Fig. 2 shows a prism arrangement in which the divergent beam of light travels in a path similar to that illustrated in Fig. 1. There are certain differences, however, due to the qualities inherent in a prism, as will be more fully explained below. It should be noted that in order to facilitate inspection of the figures and comparison between them, similar points and lines have been marked with the same numerals preceded by a serial number 100. For example, the reflecting surfaces in Fig. 1 are 1, 2, 3 and in Fig. 2 they are numbered 101, 102, 103. Only identical things have been numbered with the same number. For example, the optical axis of the entering beam is 10 in all figures. The same system of numbering is used for the other figures. Serial 200 is used for Fig. 3 and serial 300 for Figs. 4 and 5.

Referring now to the path of the light beam through the prism of Fig. 2, the entering beam 106 originates at the apex $A_{10}$ and it may be seen that it has a larger apex angle than the beam shown in Fig. 1. It intersects the prism surface 127 in the circle 110 while the optical axis which is at right angle to this surface intersects it in the point 128. With the entry into the glass, the beam changes its apex angle, as is well known, according to the difference of refraction indices on both sides, and in the present case, it decreases, so that the beam to be dealt with from now on has a smaller apex angle, as is shown in the drawing at $A_0$, Fig. 2. In order to aid comparison between Figs. 1 and 2, the apex angle of the beam inside the prism has been made about the same as that of Fig. 1 so that the entering beam outside the prism has a larger apex angle, as shown for the beam 106. Since a smaller apex angle means less spread of the beam per inch of travel, the reflecting surfaces can be moved closer together without danger of interference than with a more rapidly spreading beam with a consequent advantage of the prism arrangement over the arrangement using mirrors only. Another advantage is the use of the prism to compensate for or correct aberrations in projection objective. A plano parallel plate positioned at right angle to the axis of a converging or diverging beam causes certain aberrations similar to those of a negative lens. These qualities, however, can be used to good advantage by my invention, to flatten out the image field of the projection objective. This can not be done with a dove prism.

Returning to Fig. 2, the beam of light inside of the prism seems to emanate from the apex $A_0$, which is farther away from it than the real apex $A_{10}$. The first reflecting surface 101 is triangular in shape and extends downward from the edge C of the entrance face 127, at an angle somewhat similar to the mirror 1 in Fig. 1. The optical axis 10 impinges upon the surfaces 101 in the point 112, the cone 6 in the elliptical line 113. The reflected beam seems to emanate from the image $A_1$ of the apex $A_0$ with respect to the surface 101, as is well known. The surface 101 may be silvered or similarly coated if the conditions are such that at least part of the rays within the beam exceed the angle of total reflection. The reflected beam then travels till it impinges upon the surface 102, where it is reflected for the second time, as if emanating from the virtual apex $A_2$ and finally impinges upon the third reflecting surface 103 in the elliptical line 117, from where it is reflected as cone 9 downward towards the exit surface 118. It transsects this surface 118 in the circle 120 and enters again the air space, changing its apex angle back to what it was before entry into the prism; this cone is marked 109 and its optical axis 11 emanates from the point 116 in the same direction as and substantially parallel to that of the entering beam. The surface 118 is substantially parallel to the entrance surface 127 and the optical axis 11 is, therefore, again at right angle to the exit surface.

From the foregoing description it follows clearly that the beam of light enters and leaves the prism with its optical axis at right angle to the prism surfaces 127 and 118, and that a reversion of the image takes place within the prism.

Fig. 2 shows the prism somewhat larger than would be needed for correct transmission of the beam indicated. This was done in order not to confuse the drawing by crowding things too much. In an actual prism, the reflecting surfaces are moved so close together that interference and ghost images are avoided. Also, all empty corners can be sliced off to obtain a lighter prism. The requirements for silvering the reflecting surfaces are determined according to the known laws of optics.

Fig. 3 shows a perspective view of another embodiment of my invention, wherein two of the three reflecting surfaces are arranged to cause two reflections each, and each reflecting only a part of the entire beam. In other words, the first reflecting surface 201 serves as reflector (1) and (2) of Fig. 1 and the second reflecting surface 202 serves also as reflector (1) and (2), each for about one half of the entire beam. The two mirrors 201 and 202 meet in the edge 221—222 and in order that the two half beams shall unite correctly after the double reflection, the angle at this edge 221—222 must be a correct 90°.

The optical axis 10 of the entering beam 206 impinges at or near the edge 221—222, as shown at 212. Under these conditions substantially one half of the entering beam impinges upon each of the two surfaces 201 and 202. The left half gives the intersection line 213' upon surface 201, and the right half gives the line 213" upon surface 202. Due to the inclination of the two surfaces towards each other and towards the entering optical axis 10, the left half of the beam is now thrown over to the right surface 202, and the right half is thrown over to the left surface 201. The intersection line 215' denotes thus the second reflection of the left half of the beam, while 215" denotes the same line for the right half of the beam. This is illustrated in the drawing by showing how the ray 206 impinges upon 201 in a point of the ellipse 213' then crosses over to surface 202, impinges in a point of ellipse 215' is reflected again as ray 208' and is finally reflected the third time at the surface 203 from where the cone 209 emanates. The right half of the beam follows a similar course, with right and left exchanged, so that finally the two halves will emerge as one entire beam 209 from the mirror 203, with their optical axis 11 substantially parallel to the axis of the entering beam 10.

The optical axis of the entering and emanating beams will be exactly parallel, if the mirror 203 is exactly parallel to the edge 221—222. However, this need not be the case, since a slight inclination here instead of a zero angle can be desirable in order to compensate for the lateral displacement between the entering and emanating axes. Such an arrangement is indicated in Fig. 6, where the inclination of the reflecting surface 203' is arranged to compensate for the lateral displacement so that it is reduced for the image or focal plane. The axis 11 reaches the focal plane at the same point as the axis 10. The lateral displacement can of course be compensated by several other known means without affecting the operation of my optical inverter, as will be clearly understood by those skilled in the art.

The advantage of the structure shown in Fig. 3 over those of Figs. 1 and 2 is the very substantial reduction in size for a beam of given apex angle and entrance diameter.

Figs. 4 and 5 show elevated view and bottom view, respectively, of an optical inverter utilizing the same principle as illustrated in Fig. 3, in connection with prisms instead of mirrors. Besides, the sequence has been reversed, that is, the entering beam impinges first upon a single reflecting surface, and the entire beam is reflected towards the second and third surfaces arranged in the form of a roof, where the beam is split and undergoes a double reflection similar to that described in Fig. 3. Due to the ever increasing diameter of the divergent beam, this arrangement results in smaller over-all dimensions and a shorter lateral displacement, as will become apparent from a ray tracing of both arrangements.

It may be noted that while the rays indicated in dotted lines in Fig. 3 are only schematical, the rays shown in Figs. 4 and 5 are drawn correctly for a glass prism with 1.57 refraction index and an apex angle of the entering beam of 28°. Upon entering the prism, this angle $a$ is reduced to $b$ which seems to emanate from the virtual apex $A_0$. The first reflection occurs on the surface 301 which must be silvered at least in its upper part where the angle of incidence is outside the limits for total reflection. The virtual image of apex $A_0$ is $A_1$; from there the beam emanates towards the two reflecting surfaces 302 and 303 and intersects each in a part of an elliptical line. If the arrangement is symmetrical, so that both faces 302 and 303 have the same inclination towards 301 and if the optical axis intersects the edge 321—322 in a point 314, then the lines of intersection (or rather lines of impinging) of each half beam with its respective reflecting surface are identical in shape (part of two identical ellipses) and both will show in the projection as one and the same line 315. Here the second reflection takes place, which throws each half of the beam across the angular space of the prism to the other reflecting surface, that is from 302 to 303, and vice versa. There will be two virtual images $A_2$ of apex $A_1$ one with respect to each of the two surfaces 302 and 303, and these have not been shown in order to avoid confusion. The two reflected halves of the beam impinge upon the reciprocal surfaces in two lines 317, which again show in the projection as one line only, although they are two distinct lines, one upon surface 302 and one upon surface 303. From each line emanates one half of the reflected beam after its third reflection, and if the two surfaces 302 and 303 are correctly at right angle to each other, then these two halves of reflected beam will seem to emanate from one and the same virtual apex $A_3$, which is the virtual image of both virtual apex points $A_2$ (as above explained).

The Figure 4 shows in heavy dotted lines the cone of light 9—9 emanating from the line 317, as if coming from the virtual apex A₃ with the apex angle b', which is identical to b, and each being about ⅔ of the angle a of the cone of light outside the prism. This beam 9 travels in the prism till it transsects the exit surface 318 (Fig. 4) in the circle 320 (shown in Fig. 5), whose center 319 is the transsection point of the optical axis 11. The beam apex angle again changes to its original value, and the beam 309 emanating from the prism is, therefore, in all respects a continuation of the original beam, except for the reversion which has taken place in the prism. As has been pointed out, the two surfaces 302 and 303 are set at exactly 90° angle to each other (within 2 to 10 seconds) according to the sharpness of image definition desired so that the two halves of the beam will accurately re-unite into one image. All other angles are not critical, and my prism will give correct images at any and all distances of focal image plane from the prism, in spite of the fact that a split beam is used. This is a great advantage over other devices with split beam, such as the double dove, where a single image can be obtained only for one plane, and once the dove is adjusted for this plane, double images will be had for all other planes. The reason being that the double dove has two virtual apex points for the two halves of the split beam at the exit, and these two points cannot coincide except for infinity adjustment, that is, for a beam of parallel rays; in contradistinction, my prism provides for one and the same virtual apex point for each part of the split beam at the exit or entrance.

The rays traced in the Figs. 4 and 5 are correct for the given conditions, and the dimensions of the prism are the minimum for this given beam, and they could not be changed without affecting the operation. For example, shortening of the bottom, that is, raising the exit plane 318 so that it would pass through the point 321 (the lower end of the edge 322—321) would result in "clipping" the outer fringes of the beam, the points of the clipping being given by the intersection points of the reflection ellipse 317 with the elevation projection of the raised exit surface (horizontal line through 321). Since in Fig. 4 line 318 is tangent to ellipse 317, it shows that the beam is just passing without being clipped. It is to be understood, that a small amount of clipping will not noticeably reduce the amount of light or quality of the image. However, there will then be some rays (the "clipped" bundle) which come from the second reflection and impinge upon a "raised" exit surface instead of finding their regular third reflection surface. These rays will either be refracted out, or reflected inside the prism, and can cause annoying "ghost images." One way to avoid these ghosts is to clip the beam at the entrance to such extent that all light admitted into the prism is also transmitted correctly through it.

The entrance surface is formed by the triangular face 327, which is enclosed by the edges C—D—E; these edges being the respective intersections with the reflecting surfaces 301, 302, 303. It is evident that the entering beam must pass inside this triangle CDE. On the other hand, all rays leaving the prism must pass through an exit surface at right angles to the optical axis, as shown in 318. The part 324 of the prism is required to prevent one part of the rays from passing into the air through an inclined surface, which would result in strong aberrations and color dispersion. This part 324 can form one solid part with the rest of the prism, or be made as a separate piece and cemented to it along the line 323. In this latter case, great care must be taken to insure that the exit plane 318, which now consists of two parts, is really one plane optically, otherwise distortions and double images will result. However, this extreme accuracy can be avoided by cementing both parts with their end (or exit) face to a plano parallel plate which is common to both and constitutes the exit surface. Small differences in the angle of 324 are then filled out by cement of equal refraction index to the glass of the prism and freedom from distortion is secured. This plate can be relatively thin, about .080" to .200" depending upon the prism size, and the thick line 318 in Fig. 4 may be taken to illustrate this plate.

The structures shown in the accompanying drawings are only a few examples of the multitude of possible arrangements that may be provided in carrying out my invention. The requirements of the specific application determine which combination of elements should be used and what best relative position should be chosen. For example, a 45° prism serving as a first reflecting surface is combined with two mirror surfaces set at 90° to each other to give an arrangement similar to that of Fig. 3 if the order of elements is reversed and the mirror 203 replaced by the prism mentioned. Since the prism reduces the spread of the beam, as has been explained, a "smaller" beam reaches the twin mirrors and the size of the device is reduced, while the critical 90° angle is easier and cheaper to obtain with the twin mirrors than with a prism.

In a similar way, the reflecting surfaces in Fig. 2 may be replaced in part by mirrors, or some of the mirrors of Fig. 1 may be replaced by prisms or prism combinations with resulting savings in cost and/or space. For example, if in Fig. 1 the first and second mirrors are replaced by a prism, the resulting reduction in apex angle makes a rather small prism that produces an emanating beam of small diameter. The third reflecting surface, which being the exit is always the largest, remains a mirror surface, but it will be smaller than it would be if the entrance prism were not used. By varying the inclination of mirror 3, compensation for the lateral displacement can be obtained.

I found that this large variety of structures which fit the requirements of my teachings have in common certain simple characteristics which are as follows: they comprise three reflecting areas inclined with respect to each other and also having inclined with respect to each other the intersection lines of their respective geometrical planes with a plane at right angle to the optical axis of the system.

By "inclined," is understood any angle greater than 0 degree, and this does not include the angle of 90°.

An inspection of all figures will show this to be true for each of them. In Fig. 1, a plane square to the optical axis would be square to 10 and 11. Each of the mirror surfaces will intersect this plane in a line somewhat parallel to the upper edge of each respective mirror. It is clear then that these lines are inclined towards each other. In Fig. 2, the top surface of the prism or entrance plane 127 can be taken as the plane square to the optical axis, because it is positioned at a right angle thereto. The reflecting surfaces 101, 102, 103, intersect this plane in the lines C, D, E respectively, which also form the edges of the prism. Evidently they are inclined towards each other and in this specific case they form a triangle through which the entering beam of light must pass.

In Fig. 3 we have to imagine a plane square to the optical axis and it will be seen that the intersection lines of the three surfaces will be substantially parallel to their upper edges C', D', E'. In Figs. 4 and 5 we can again take the entrance plane surface which is square to the optical axis. The three reflecting surfaces 301, 302, and 303 again form the edges of the triangular entrance surface C, D, E.

Any combination of three reflecting surfaces that fulfill the above named conditions and are arranged to project the exit beam substantially parallel and in the same direction as the entering beam will give a desired optical inverter, that is, a rotation of the device around the optical axis will cause rotation of the transmitted image in its own plane.

What I claim is:

1. A prism for inverting a beam of divergent light, said prism comprising an entrance surface and a substantially larger exit surface positioned parallel to each other, a first internal reflecting surface extending from one edge of said entrance surface and terminating approximately halfway between said entrance and exit surfaces and inclined at substantially 45° with respect to said entrance surface, the prism being expanded in width between the lower end of the first reflecting surface and said exit surface, and two additional internal reflecting surfaces obliquely facing said first-named reflecting surface, positioned symmetrically with respect thereto, and defining a roof surface facing the first reflecting surface, the edge formed by said two additional reflecting surfaces being substantially parallel to said first-named reflecting surface.

2. A prism for inverting a beam of divergent light, said prism comprising an entrance surface and a substantially larger exit surface positioned parallel to each other, a first internal reflecting surface extending from one edge of said entrance surface and terminating approximately halfway between said entrance and exit surfaces and inclined at substantially 45° with respect to said entrance surface, the prism being expanded in width between the lower end of the first reflecting surface and said exit surface, and two additional internal reflecting surfaces obliquely facing said first-named reflecting surface, positioned symmetrically with respect thereto, and defining a roof surface facing the first reflecting surface, said additional reflecting surfaces being inclined with respect to each other at an angle of exactly 90°, the edge formed by said two addditional reflecting surfaces being substantially parallel to said first-named reflecting surface.

3. A prism for inverting a divergent light beam comprising an entrance surface, an exit surface parallel to and being at least two to four times greater in area than said entrance surface, an internally reflecting surface inclined at substantially 45° to said entrance surface and extending from said entrance surface toward the exit surface to a point approximately halfway between said entrance and exit surfaces, the prism being expanded in width between the lower end of the first reflecting surface and said exit surface, and two additional internally reflecting surfaces obliquely facing each other and said first-named reflecting surface, said two last-named reflecting surfaces respectively connecting corresponding side edges of said entrance and exit surfaces, whereby a light beam will be reflected from the first reflecting surface to one of the additional reflecting surfaces, thence to the other additional reflecting surface, and thence through the exit surface.

RICHARD T. ERBAN.

REFERENCES CITED

The following references are of record in the file of this patent:

UNITED STATES PATENTS

| Number | Name | Date |
| --- | --- | --- |
| 1,479,212 | Ames | Jan. 1, 1924 |
| 1,631,866 | Heuring | June 7, 1927 |
| 1,892,893 | Karnes | Jan. 3, 1933 |

FOREIGN PATENTS

| Number | Country | Date |
| --- | --- | --- |
| 142,184 | Switzerland | Nov. 17, 1930 |
| 480,343 | Great Britain | May 17, 1935 |